United States Patent [19]

Funderburgh

[11] 4,219,131

[45] Aug. 26, 1980

[54] GREASE GUN WITH PRESSURE RELEASE ASSEMBLY

[76] Inventor: Roger Funderburgh, 1840 Park Rd., Woodstock, Ohio 43084

[21] Appl. No.: 19,632

[22] Filed: Mar. 12, 1979

[51] Int. Cl.² .............................................. F16N 3/12
[52] U.S. Cl. .................................... 222/1; 222/383; 222/397; 417/307; 239/124
[58] Field of Search ............................ 222/1, 325–327, 222/340, 380, 383, 397; 184/105 A, 105 C; 417/307; 251/322; 137/881; 239/124

[56] References Cited

U.S. PATENT DOCUMENTS

| | | |
|---|---|---|
| 2,615,598 | 10/1952 | Watkins et al. ..................... 222/397 |
| 3,338,478 | 8/1967 | Hedblad . |
| 3,788,427 | 1/1974 | Fox et al. ......................... 222/397 X |
| 4,062,425 | 12/1977 | O'Dell et al. .................... 222/397 X |
| 4,063,618 | 12/1977 | O'Dell ............................. 222/397 X |
| 4,077,493 | 3/1978 | Spaude et al. ................... 222/326 X |

Primary Examiner—David A. Scherbel
Assistant Examiner—Fred A. Silverberg
Attorney, Agent, or Firm—Millard, Cox & Smith

[57] ABSTRACT

Disclosed is an air pressure release assembly, which preferably is a valve, for attachment to a grease gun to release air pressure within the gun which air pressure retards dispensing of grease from the grease gun.

4 Claims, 2 Drawing Figures

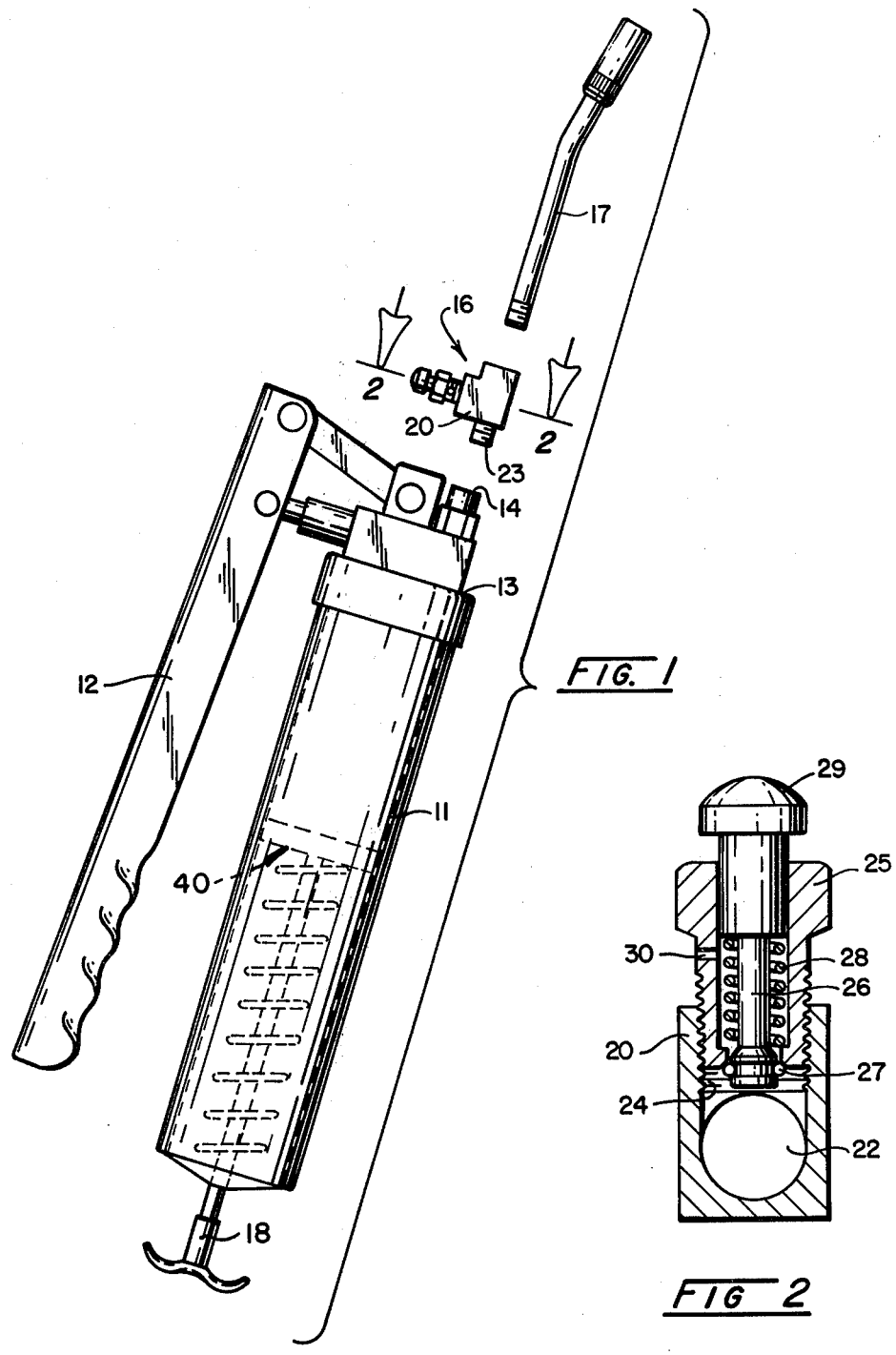

GREASE GUN WITH PRESSURE RELEASE ASSEMBLY

DESCRIPTION

BACKGROUND OF THE INVENTION

The present invention relates to grease guns and more particularly to a grease gun having a pressure relief valve assembly which releases air in the dispensing pump, which air retards flow of lubricant from the gun. It is well known that when air bubbles, in sufficient quantity, are drawn into the cylinder of a dispensing pump the next stroke will not cause the grease to flow from the dispensing nozzle. The reason is that air is compressible and the dispensing stroke of the piston will compress the air, but the pressure of the compressed air is not great enough to push grease out of the nozzle. The result is a blockage or vapor lock within the pump which makes the grease gun inoperable.

A variety of machinery requires frequent lubrication while in operation. For example, farm machinery in use in a remote location employs portable manual grease guns for lubrication several times daily. Often, air becomes entrapped in the gun and forms an air pressure pocket which prevents the flow of grease as indicated above. The operator can disassemble the gun to bleed the air but more often, time dictates that the plugged gun be set aside and another gun used instead. Thus, several grease guns are customarily filled each day and carried to the work site.

Heretofore, pressure relief valves have been installed on high pressure grease guns to relieve the delivery pressure when the gun is not in operation (U.S. Pat. Nos. 4,062,425; 4,063,618 and 3,788,427). Air pressure built-up at the delivery tube or extension of a manually operated grease gun has not been recognized as a serious problem in the art nor have solutions thereto been proposed.

The present invention provides an efficient and simple solution to this air pressure pluggage problem which makes it especially convenient for the operator in the field to quickly restore operation of the gun. Thus, the operator need spend little time in handling the grease gun should an air pressure pluggage occur and he can devote more time to operation of the machinery.

BROAD STATEMENT OF THE INVENTION

The present invention is for a grease gun of the type having a case for retaining grease, a detachable dispensing extension attached to said case, and mechanical pump means associated with said case and said extension for feeding grease from said case through said extension to dispense grease to the point to be lubricated. The improvement of the present invention comprises an air pressure release assembly interposed between the pump and the point to be lubricated. The assembly is actuatable for releasing air pressure within the pump, which air pressure retards dispensing of grease from the gun. The preferred air pressure release assembly is an internally seating pin valve which is spring biased to a closed position.

The present invention also is for a method for releasing air pressure within a pump of the type described above which pressure retards dispensing of grease from the gun. Such method comprises interposing an air pressure release assembly between the pump and the point to be lubricated.

BRIEF DESCRIPTION OF THE DRAWINGS

FIG. 1 is an exploded view of a lever-operated grease gun, an air pressure relief assembly, and a dispensing extension; and FIG. 2 is a sectional view of the air pressure release assembly, taken along line 2—2 of FIG. 1.

The drawings will be described in detail in connection with the description of the invention which follows.

DETAILED DESCRIPTION OF THE INVENTION

The basic grease gun is conventional in construction and preferably is a lever operated grease gun such as shown in, for example, U.S. Pat. Nos. 4,077,493 and 3,338,478, the disclosures of which are expressed incorporated herein by reference.

The grease gun shown in FIG. 1 is like the grease guns shown in the aforecited patents and is composed of three primary units: a case including cylinder 11 and dispensing head 13, pressure relief assembly 16, and dispensing extension 17. These primary units are shown in their proper arrangement for installation of assmbly 16 to the body of the grease gun and of dispensing extension 17 to assembly 16. Cylinder 11 is fitted with dispensing head 13 which screws thereon. Grease is retained in cylinder 11. Cylinder 11 also contains a spring biased plunger and rod assembly 40 with handle 18 for operating such assembly. The rod and plunger assembly provides low pressure feeding of grease from cylinder 11 to a high pressure piston pump disposed within dispensing head 13. Such piston pump is manually operated by lever handle 12. The internal structure of the pump is conventional and illustrated in the patents incorporated by reference and no specific structure is shown nor described. It is clear that the location of the pump in the overall assembly is not critical except that it must be located between the grease reservoir and the point to be lubricated and valve assembly 16 should be downstream from the pump and in close proximity to the pump outlet.

Grease pumped by the piston pump disposed within dispensing head 13 flows out of the grease gun case through outlet 14. In prior art pumps, dispensing extension 17 is screwed into the case at outlet 14 and it is at this juncture in the grease gun or within the pump itself that air pressure pockets can form which retard and often plug the flow of grease from the grease gun. Pressure release assembly 16 is interposed between the grease gun case at outlet 14 and dispensing extension 17. All of these parts can be connected by screwing them together in conventional fashion in the arrangement shown in FIG. 1. Without pressure release assembly 16, the operator can only release the air pressure and restore operation to the grease gun by unscrewing dispensing extension 17 and pumping several strokes to bleed the air and feed some grease from the gun through grease outlet 14 and then resecuring dispensing extension 17 to the gun for further operation of the grease gun. With pressure release assembly 16 in position, the operator need only activate such assembly to immediately release the pressure and restore normal operation to the grease gun. Preferably, the pump is in pumping condition by pumping a stroke or strokes during activation of assembly 16 to ensure release of the air pressure and to restore a free flow of grease.

FIG. 2 depicts preferred pressure release assembly 16 in cross section. Assembly 16 is composed of adaptor 20 which contains passageway 22 for carrying grease from the pressure pump located within dispensing head 13 and into dispensing extension 17 for dispensing of grease from the grease gun. Passageway 22 includes internal threads at one of its ends for receiving threaded extension 17 therein and at its other end terminates at externally threaded boss 23 (FIG. 1) which screws into the grease gun case at outlet 14 of dispensing head 13. Adaptor 20 further contains an internally threaded cavity 24 at its center which is perpendicular to passageway 22, which internally threaded cavity is for attachment of an air pressure relief valve.

The preferred valve depicted in FIG. 2 is an internally seating pin valve, spring biased to a closed position. It includes an externally threaded valve case 25 for mounting within the threaded cavity 24. An internally seated pin 26 retained within case 25 by retaining and sealing ring 27 is biased to closed position by spring 28. Valve cap 29 may be manually depressed to open the valve and thus, release air pressure build-up in the grease gun through air outlet 30 in case 25. The valve and adaptor 20 can be manufactured from metal, plastic, or any other suitable material, but preferably are metal such as brass, for durability and resistance to corrosion. The speed and ease with which air pressure built-up in the grease gun can be released using the air pressure release assembly shown in FIG. 2 is readily apparent.

Of course, those skilled in the art will appreciate that a variety of other assemblies can be substituted for the preferred assembly depicted in FIG. 2 and such other assemblies clearly are within the spirit and scope of the present invention. For example, the assembly can be a one piece integral unit with a self contained air pressure relief valve. Also, the valve can be activated by rotation of a screw to release the pressure or other conventional means rather than by the preferred internally seated pin valve spring biased to a closed position. Further, conventional grease guns other than the lever operated grease gun shown in FIG. 1 suitably can be modified with the air pressure release assembly of the present invention for release of air pressure built-up in such other guns.

What is claimed is:

1. A method for releasing air pressure within a grease gun which air pressure retards dispensing of grease from said gun, said grease gun being a portable, manual grease gun of the type having a case for retaining grease, a dispensing head fitted onto one end of said case and having a grease outlet, a lever-operated piston pump disposed within said head, a detachable dispensing extension attached to said grease outlet, and means for feeding grease in said case to said piston pump, said piston pump operative to pump grease fed to it through said grease outlet in said extension for dispensing grease from said gun, comprising:

interposing between said grease outlet and said extension a manually-operated air pressure release assembly, said assembly being interposed in close proximity to said pump for releasing air pressure from said pump which air pressure can form in said pump when said case and said extension contain grease and said gun is in operation, said air pressure retarding dispensing of grease from said gun, said lever and said assembly being concurrently operable, and said lever and said assembly being arranged so that said lever cannot actuate said assembly; and actuating said air pressure release assembly concurrently with said lever for releasing therethrough said air pressure to the atmosphere when said air pressure is in said pump and is retarding dispensing of grease from said gun.

2. The method of claim 1 wherein said assembly interposed comprises a valve.

3. The method of claim 2 wherein said valve interposed is an internally seated pin valve which is spring biased to a closed position.

4. The method of claim 3 wherein the interposing of said valve comprises screwing said valve into an adapter, said adapter having a passageway therethrough, one end of said passageway screwing into said grease outlet and the other end having said extension screwed thereinto, said adapter also having a cavity communicating with and perpendicular to said passageway, said cavity threaded for receiving said valve thereinto.

* * * * *